United States Patent [19]
Yun

[11] Patent Number: 5,946,975
[45] Date of Patent: *Sep. 7, 1999

[54] INTERFERENCE PREVENTING GEAR IN COMMUNICATION EQUIPMENT AND ELECTRIC APPARATUS

[75] Inventor: Young-Jung Yun, Suwon, Rep. of Korea

[73] Assignee: SamSung Electronics Co., Ltd., Kyungki-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/695,805

[22] Filed: Aug. 12, 1996

[30] Foreign Application Priority Data

Aug. 10, 1995 [KR] Rep. of Korea ....................... 95/24737
Apr. 22, 1996 [KR] Rep. of Korea ....................... 96/12245

[51] Int. Cl.$^6$ ................................................... F16H 55/06
[52] U.S. Cl. ................................. 74/462; 74/460; 74/457
[58] Field of Search ............................. 74/457, 460, 462

[56] References Cited

U.S. PATENT DOCUMENTS

| | | |
|---|---|---|
| 2,463,725 | 3/1949 | Stonebraker . |
| 2,682,760 | 7/1954 | Shenk . |
| 3,043,158 | 7/1962 | Herr, Jr. . |
| 3,881,365 | 5/1975 | Hardy . |
| 4,051,745 | 10/1977 | Ishikawa . |
| 4,276,785 | 7/1981 | Rouverol . |
| 4,744,263 | 5/1988 | Kuiken ..................................... 74/462 |
| 4,942,781 | 7/1990 | Hori ..................................... 74/462 X |

FOREIGN PATENT DOCUMENTS

| | | |
|---|---|---|
| 12 86 361 | 1/1969 | Germany . |
| 3-28565 | 2/1991 | Japan . |
| 1486662 | 6/1989 | U.S.S.R. ................................. 74/462 |
| 2 224 554 | 5/1990 | United Kingdom . |

*Primary Examiner*—John A. Jeffery
*Assistant Examiner*—David Fenstermacher
*Attorney, Agent, or Firm*—Robert E. Bushnell, Esq.

[57] ABSTRACT

A high addendum tooth for a spur gear that prevents interference upon engagement with other high addendum gear teeth when the engaging gears are not perfectly aligned. The gear tooth design is divided into two portions along the face width of the tooth. The first portion is located at the first end of the tooth and involves having a high tooth height. The sidewall or face surface of this first portion may be involute, flat, or some other profile. The second portion of the gear tooth is situated along the remainder of the length of the tooth extending from the first portion to the second end. The second portion does not have a high tooth height. Instead, the top of the second portion of the tooth is cut and ground to have a flat surface. The second portion is proportionally much longer and occupies a much greater portion of the face width than the first portion. This design allows the engaging gear teeth to slide over each other instead of gouging into each other, thus facilitating smoother operation between slightly misaligned spur gears.

15 Claims, 7 Drawing Sheets

INTERFERENCE PREVENTING GEAR IN COMMUNICATION EQUIPMENT AND ELECTRIC APPARATUS

CROSS-REFERENCE TO RELATED APPLICATIONS

This application makes reference to, incorporates the same herein, and claims all benefits accruing under 35 U.S.C. §119 arising from an application for Interference Preventing Gear in Communication Equipment and Electric Apparatus earlier filed in the Korean Industrial Property Office, on Aug. 10, 1995 and there duly assigned Ser. No. 24737/1995, and on Apr. 22, 1996 and there duly assigned Ser. No. 12245/1996.

FIELD OF THE INVENTION

The present invention concerns the design and shape of a tooth for a spur gear. In particular, this invention pertains to a gear tooth that provides for both better engagement properties and for less interference than conventional gear tooth structures.

BACKGROUND OF THE INVENTION

Generally, a plurality of gears are arranged to be engaged with each other in a driving mechanism. Since gear teeth (teeth addendums) contact each other during engagement, the teeth of the gears often collide during meshing. So far, collision between gear teeth of different gears are prevented by providing a gap between a gear hole and a shaft or by using higher gear teeth. Employing heightened gear teeth in spur gears not only reduces the possibility of collisions between aligned gears, it also provides for more stability between the gears once engaged as there is a smaller chance of slipping when the teeth addendum is greater. Therefore, in many instances, it is desirable to use gears having a heightened tooth design. The benefits of a heightened tooth design in spur gears however can only be realized if the engaging gears are perfectly aligned. Perfect gear alignment is often difficult to achieve consistently, particularly for low cost gear trains designed to be installed in assembly lines. I have consequently found that there is a need for an improved tooth design that reduces the risk of gear teeth collision when gears are slightly misaligned.

There has been some effort in the art to improve the design of gears. For example, U.S. Pat. No. 2,682,760 for a Gear Coupling to Shenk seeks to overcome interference and friction problems during the coupling process of gears, even when the gears are slightly misaligned. Among other things, Shenk seeks to reduce interference by using a tooth design, with the tooth height set in a way such that the teeth are crowned across the face width, thus having the tooth highest half way between the end portions of the gear tooth. I have found that Shenk's design lacks a flat portion on the top of the tooth.

U.S. Pat. No. 3,881,365 titled Gearing to Hardy proposes a tooth design for a gear to cut down on noise generated during operation. Hardy's disclosure addresses the need to correct noise created tooth imperfections and off tolerances. Hardy's design involves tapering the top surface of the tooth along the face width. Hardy's design does not seem to address the problem of misalignment between gear shafts however.

U.S. Pat. No. 2,463,725 for a Method of Cutting Gear Pairs to Stonebraker discloses a novel tooth design for a gear in an effort to provide better contact upon coupling. The height of the tooth or the addendum gradually varies with distance along the face width. U.S. Pat. No. 3,043,158 for a Means for Maintaining a Pair of Mating Gears in Mesh to Herr discloses a novel tooth design for a gear that involves tapering along the face width. U.K. Patent application 2224554A to Hill discloses novel tooth designs for reducing noise and vibrations during operation. There appears to be no disclosure of varying the tooth height along the face width.

Japanese patent 3-28565 A to Morikawa discloses a novel tooth design used to reduce noise and vibration during operation. Morikawa's design involves a chamfer in the gear tooth. German patent 1286361 discloses a novel tooth design for a gear. The tooth height or addendum varies along the length of the face.

Although the prior efforts appear to contain tooth designs for spur gears that both heighten the gear teeth and to correct misalignment between coupling gears, I have found that there exists a need for a gear able to compensate for out-of-parallel alignment between the shafts of successive gears within a train of gears.

SUMMARY OF THE INVENTION

Accordingly, it is an object of the present invention to provide an improved gear.

It is another object to provide a gear able to minimize collisions between gear teeth during engagement by forming a cut surface at a portion of a face width by cutting a part thereof, so that damage due to the gear collisions as well as and malfunction of the equipment or apparatus can be prevented.

It is yet another object to provide an interference preventing gear able to reduce noise during operation of a driving mechanism by preventing contact between addendums of gear teeth during meshing.

It is still another object to provide spur gears with heightened teeth that can operate efficiently and effectively when the coupled gears are not perfectly aligned.

It is still yet another object to provide a spur gear that has both a heightened tooth design and a tooth design that prevents interference during meshing with other gears that are misaligned.

It is a further object to provide a design for a gear able to compensate for out-of-parallel alignment between normally parallel shafts of meshing gears, and to compensate for incorrect positioning of the shafts of normally meshed gears.

It is still a further object of the present invention to provide a design for a spur gear tooth that enables gear teeth to slide over each other when in contact, thus enabling slightly misaligned spur gears to continue to rotate despite the fact that the teeth of each gear are in contact with each other.

To achieve the above objects, there is provided an interference preventing spur gear tooth design having a high tooth profile feature at one end of the face width of the tooth and a flat cut out portion along the remainder of the face width of the tooth. The flat cut out portion does not contain a high tooth feature and extends across the majority of the face width of the tooth. The flat cut out portion is to minimize collisions between gear teeth and to allow gear teeth of opposing, slightly misaligned spur gears to slide over each other instead of damaging each other, thus enabling slightly misaligned gears to continue to rotate despite any imperfections in their alignments.

BRIEF DESCRIPTION OF DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1A:
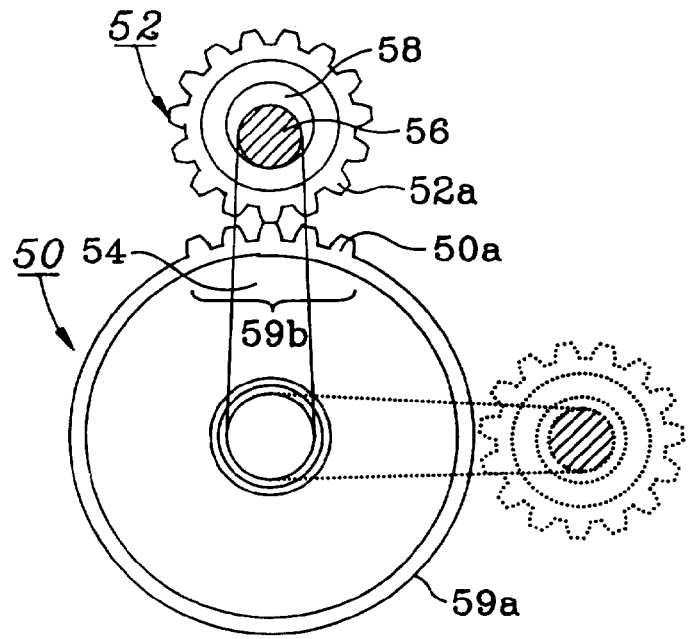
FIG. 1A illustrates the case where collision between addendums of gear teeth occurs, in which a gap is provided between a gear's shaft and a shaft to prevent collision between gear teeth according to an embodiment of contemporary theory of gear design.
Figure 1B:
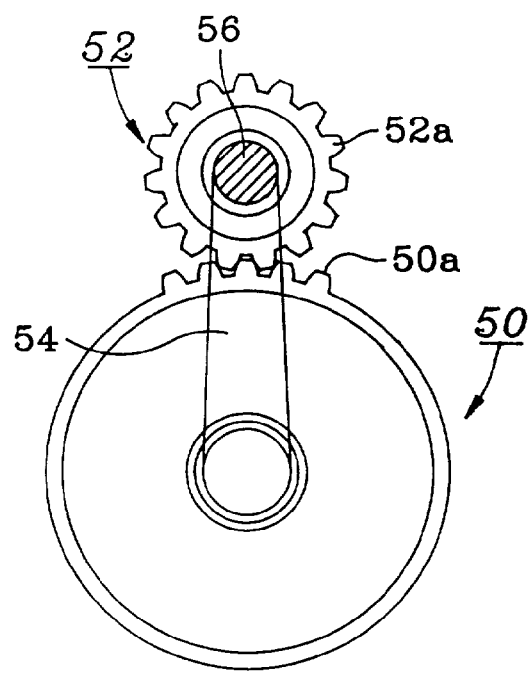
FIG. 1B shows a state where the addendums of gear teeth are returned to the original places after the collision.

Turning now to the drawings, FIGS. 1A and 1B show one approach for reducing interference between engaging gears. A gap is provided between gear hole 58 and shaft 56 of connecting gear 52 which is engaged with a driving gear 50 so that collision between addendums of respective teeth 50a and 52a are prevented. In FIG. 1A, connecting gear 52 associated with link 54 is rotated counterclockwise in the plane of the page, along toothless gear portion 59a (upon halting the power supply between both engaged gears during a predetermined time). When the teeth 52a of connecting gear 52 begin to mesh with the teeth 50a arrayed along a toothed gear portion 59b (upon supplying the power supply between both gears), the teeth addendums of teeth 50a and 52a of gears 50 and 52 slide over each other to form a meshed arrangement because of the allowable variation in distance between the shafts of gears 50 and 52. Sometimes, the connecting gear 52 and the driving gear 50 can be returned to their original, meshed places as shown in FIG. 1B. But, in some cases, a malfunction of the driving mechanism can frequently occur, preventing the gears from meshing, as shown in FIG. 1A.

Figure 2A:
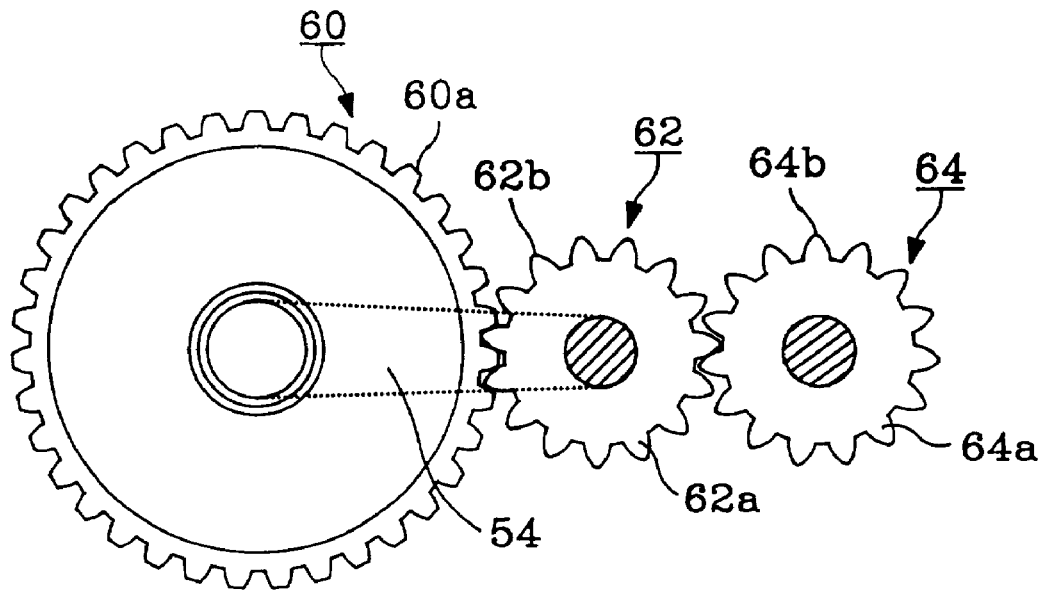
FIG. 2A illustrates the state where collision between gear teeth is prevented with employing a common high-teeth gear according to another embodiment of contemporary gear design.
Figure 2B:
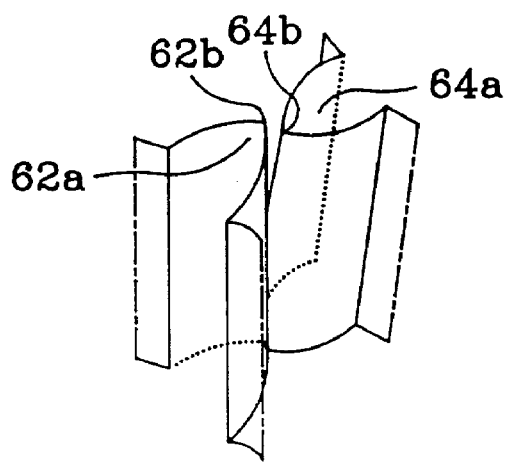
FIG. 2B illustrates in detail the collision state between teeth of two normally meshed gears.

If a gear arrangement of FIG. 2A is employed, however, the distance between the shafts is unchangeable and the above-described approach is not applicable to prevent interfering collisions. FIGS. 2A and 2B illustrate another approach to reducing interference between engaging gears. With regard to FIGS. 2A and 2B, the teeth height on connecting gear 62 and on idle gear 64 are heightened along an involute sidewall face profile. Ideally, when the shafts of the engaging gears are exactly parallel to each other, the gear arrangement shown in FIG. 2A is sufficient in reducing interference between engaging teeth and in reducing slippage between engaging teeth. However, as is often the case, the shafts of the gears are not exactly parallel to each other, and instead, they become misaligned. When misaligned, the heightened teeth addendums 62b and 64b of engaging gears 62 and 64 respectively collide, as shown in FIG. 2B. In situations as in FIGS. 2A and 2B where the teeth addendums of both of the colliding teeth are pointed, there is a tendency for the teeth addendums to gouge into each other upon collision, as is shown in FIG. 2B, thus greatly impeding or even prohibiting further rotation between connecting gear 62 and idle gear 64, in addition to damaging gear teeth 62a and 64a. Because gear misalignment in spur gears is a common occurrence, there is a need for an improved tooth design that can avoid interference in these situations and allow gears to mesh more smoothly.

Figure 3A:
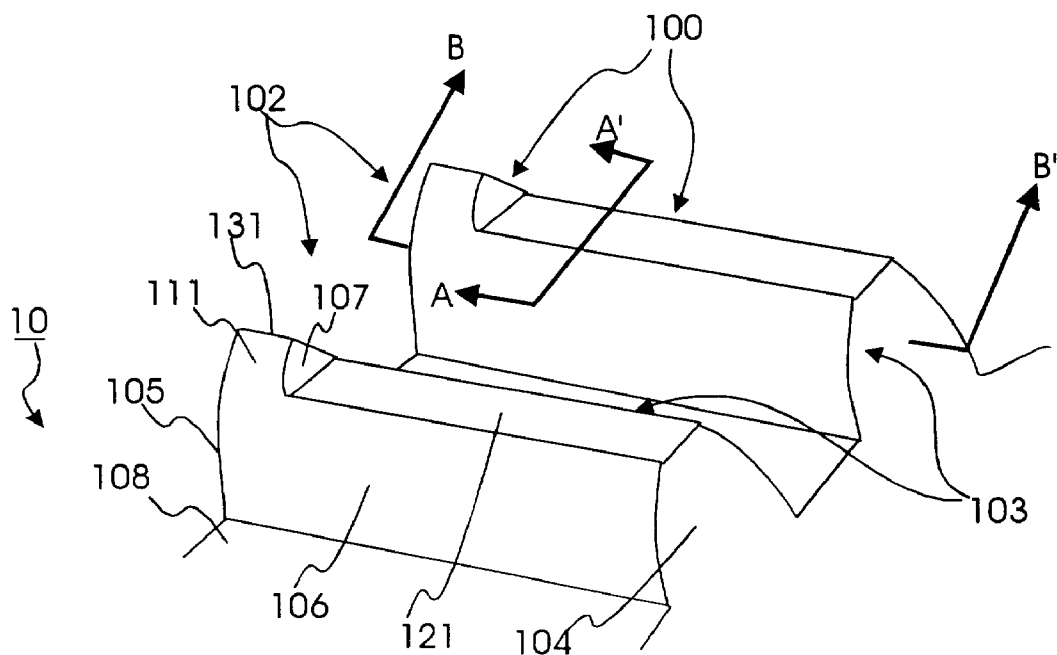
FIG. 3A shows a perspective view of amplified high-teeth on a spur gear constructed as a first embodiment of the present invention.
Figure 3B:
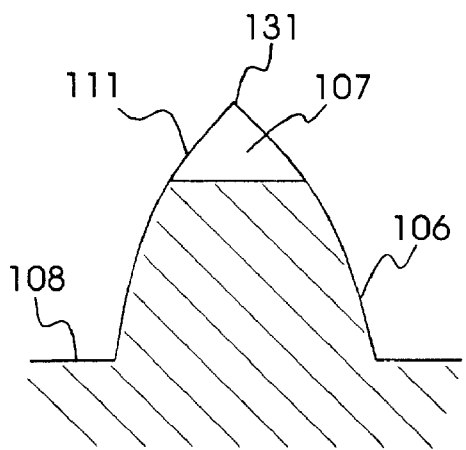
FIG. 3B is a cross-sectional view in the direction of sectional line AA' shown in FIG. 3A.
Figure 3C:
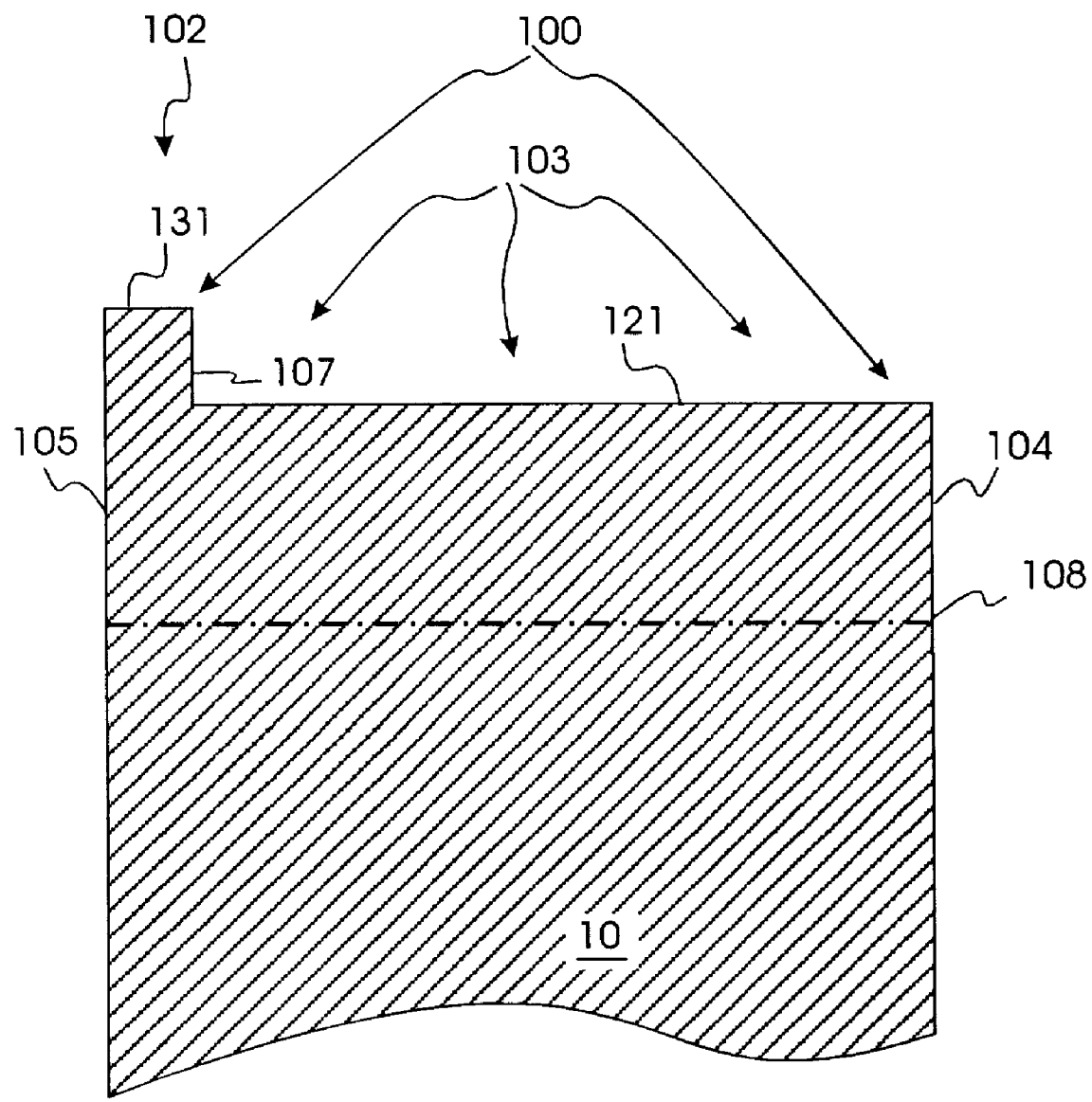
FIG. 3C is a cross-sectional view in the direction of sectional line BB' shown in FIG. 3A.
Figure 5A:
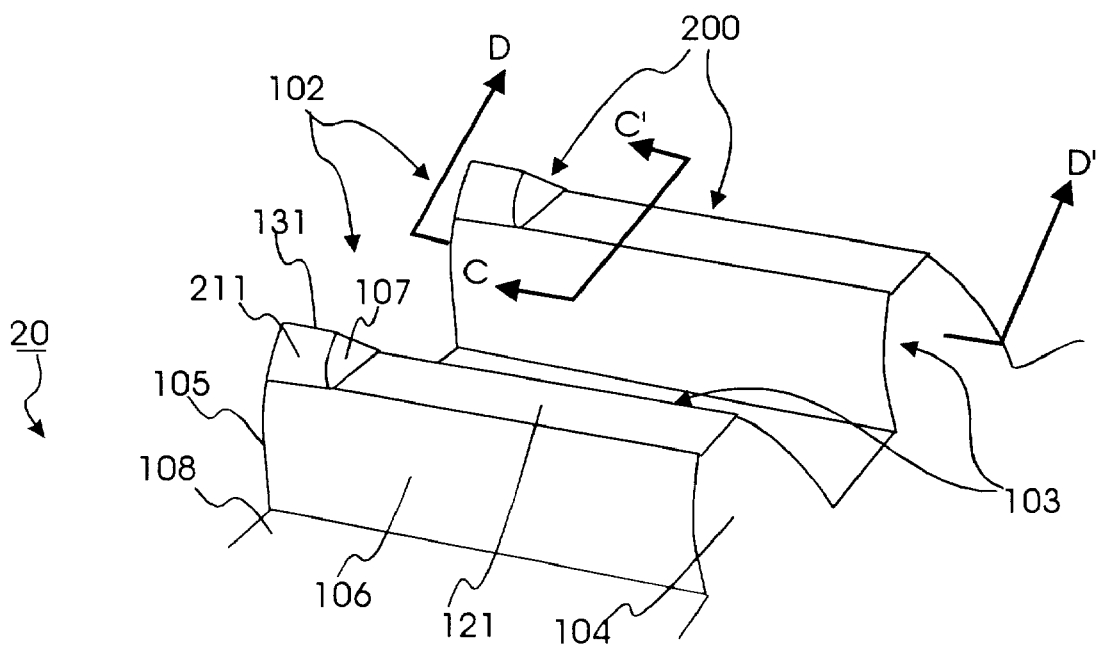
FIG. 5A shows a perspective view of amplified high-teeth on a spur gear constructed as a second embodiment of the present invention.
Figure 5B:
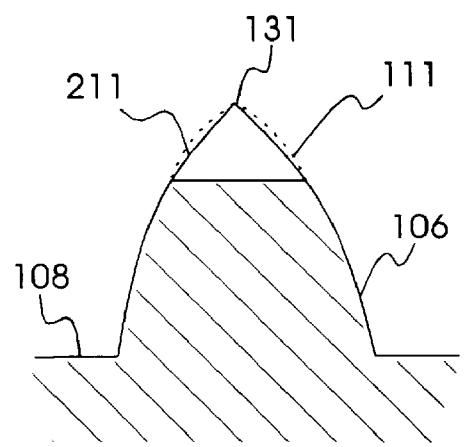
FIG. 5B is a cross-sectional view in the direction of sectional line CC' shown in FIG. 5A.
Figure 5C:
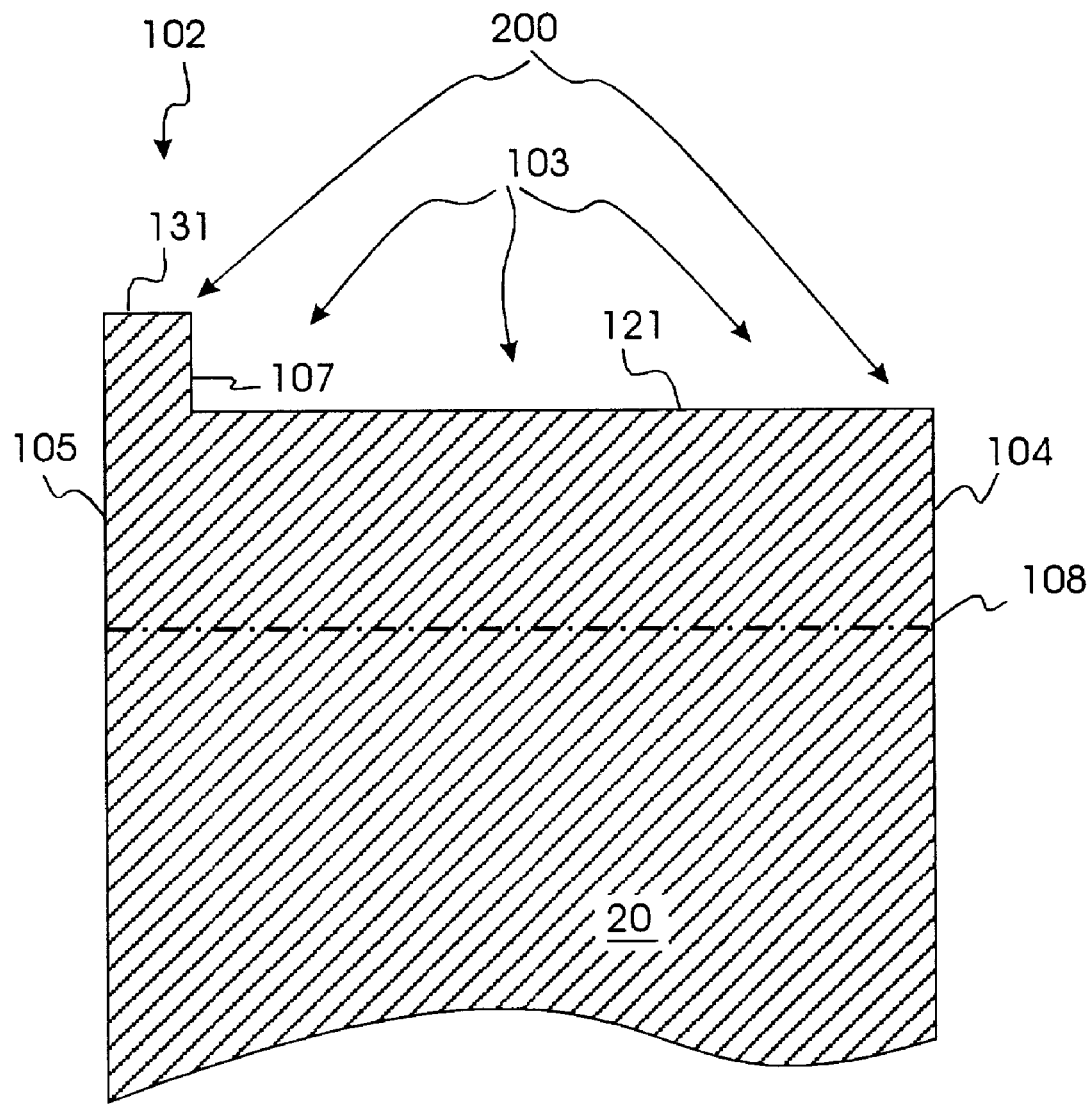
FIG. 5C is a cross-sectional view in the direction of sectional line DD' shown in FIG. 5A.

The present invention seeks to overcome the problem of gear interference between heightened teeth of slightly misaligned spur gears. FIGS. 3A, 3B, and 3C illustrate a tooth design according to the first embodiment of the present invention that reduces interference between engaging teeth in spur gears even when the gears are not perfectly aligned. FIGS. 5A, 5B, and 5C illustrate the improved tooth design according to the second embodiment of the present invention.

FIG. 3A shows two adjacent teeth having the present novel tooth design, each extending radially outward from base 108 of spur gear 10. Each novel tooth 100 has a first end 105 and a second end 104 placed a face width away and on opposite sides of tooth 100. The face width of tooth 100 can be divided into two portions, the first portion being the heightened portion 102 located adjacent to first end 105 of tooth 100. The second and remaining portion, the cut-out portion 103, is located between heightened portion 102 and second end 104 of tooth 100. Cut-out portion 103 occupies a substantially larger portion of the width of tooth 100 than heightened portion 102. Tooth 100 contains side surfaces 106 extending from base 108 to the top portion of tooth 100. Side surfaces 106 are of an involute curved profile. The top surface 121 of cut-out portion 103 of tooth 100 is flat. Heightened portion 102 of tooth 100 has an involute sidewall 111 that is an extension of the involute sidewall 106. Unlike cut-out portion 103, heightened portion 102 contains no top surface. Instead, ridge 131 is formed where the involute sidewall profiles 111 from each side of tooth 100 meet. Interior end surface 107 of heightened portion 102 is a flat surface formed on the opposite end of heightened portion 102 from first end 105. Interior end surface 107 is perpendicular to top surface 121 of cut-out portion 103. Interior end surface 107 is flat and forms the boundary between heightened portion 102 and cut-out portion 103 on the top of tooth 100. FIG. 3B is a cross section of the tooth in FIG. 3A sliced perpendicular to the face width within cut-out portion 103. FIG. 3B is taken from the middle of the face width of tooth 100 and is viewed in the direction of heightened portion 102. The cross section in FIG. 3B shows a better view of interior end surface 107. Finally, FIG. 3C is a cross section of tooth 100 sliced parallel to the face width of tooth 100. FIG. 3C clearly shows heightened portion 102 and cut-out portion 103 of tooth 100 and the respective portions of the face width that each of these portions occupy. As can be seen from FIG. 3C, the heightened portion 102 occupies a much smaller fraction of the width of the tooth 100 than does cut-out portion 103.

Figure 4A:
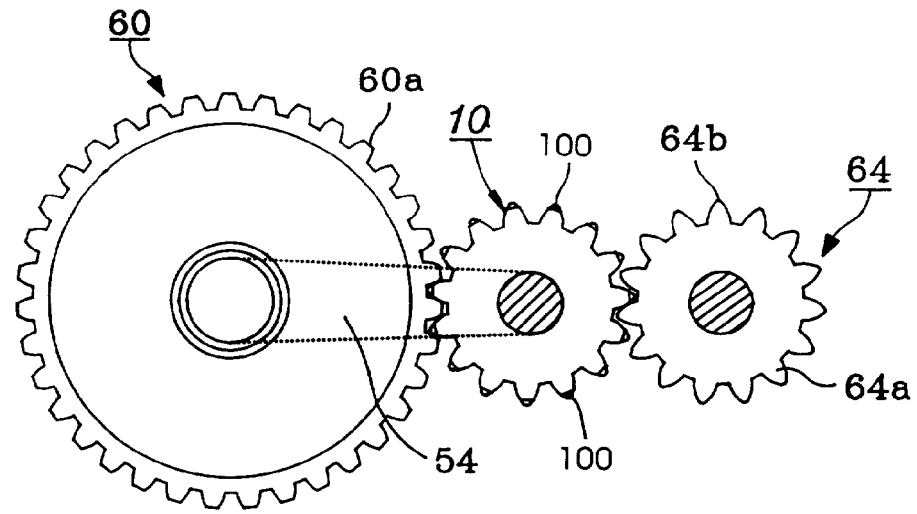
FIG. 4A illustrates the state where a high-teeth gear constructed according to a preferred embodiment of the present invention is employed.

FIG. 4A illustrates a situation where a spur gear containing the tooth design 100 according to the first embodiment of the present invention could be advantageous over the prior art. FIG. 4A is the same as FIG. 2A except that the connecting gear 10 contains at least one tooth having the novel design as shown in by FIG. 3. If any of the gears in FIG. 4A are not perfectly aligned to each other, the tooth design of FIG. 3 would provide an advantage over the prior art by providing less interference and more stability between the meshing gears.

Figure 4B:
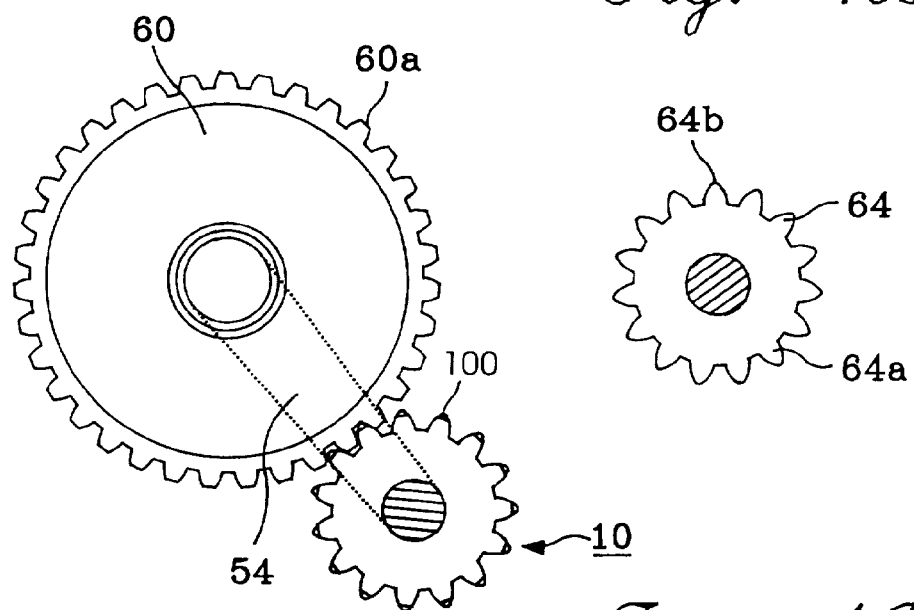
FIG. 4B shows the state where a high-teeth gear is displaced.
Figure 4C:
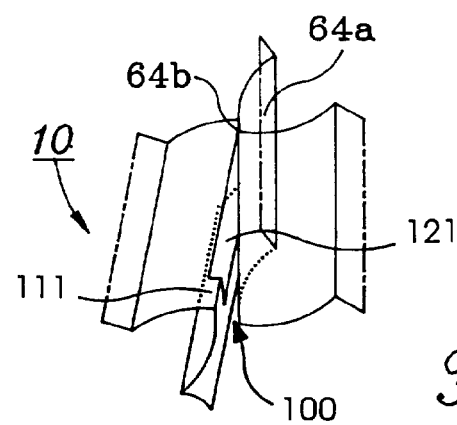
FIG. 4C shows a displaced high-teeth gear during a collision.

As shown in FIGS. 4A, 4B and 4C, when a common driving gear 60 rotates, the engaged connecting gear 10 is rotated. "It should be noted that the gear teeth of the present invention may be constructed with a constant pressure angle." Thus, the idle gear 64 rotates. During gear rotation, tooth addendum 60a of the driving gear 60 contacts top ridge 131 of the heightened portion 102 of tooth 100 of the connecting gear 10, and top ridge 131 of connecting gear 10 operates with and makes contact with tooth addendum 64b of the idle gear 64. As shown in FIG. 4B, the connecting gear 10 can accurately engage with driving gear 60 though moved by the link 54. Also, as shown in FIG. 4C, in a structure where connecting gear 10 and idle gear 64 are misaligned, teeth 64a and 100 are in contact, and since the heightened portion 102 is formed on tooth 100 on connecting gear 10 and cut-out portion 103 containing flat top surface 121 is also formed on tooth 100, the pointed tooth addendums 64b of idle gear 64 can slide over flat top surface 121 of cut-out portion 103 of tooth 100 of connecting gear 10 instead of gouging into tooth 100. As a result, design of tooth 100 in FIGS. 3A, 3B, and 3C allow idle gear 64 to be driven more smoothly with connecting gear 10 when idle gear 64 is slightly misaligned to connecting gear 10.

The tooth design for the second embodiment of the present invention is shown in FIGS. 5A through 5C. The second embodiment is identical to the first embodiment except that the involute sidewall profiles 111 of the heightened portion 102 in the first embodiment are replaced with a different sidewall profile. This new profile 211 can be a flat surface as is shown in FIG. 5B, or any other sidewall profile that can be formed within the involute curve 111. Involute profile 111 is shown as a phantom line in FIG. 5B to illustrate that the flat sidewall surfaces used in the heightened portion 102 of the second embodiment are formed within the involute profile. FIG. 5B shows just one possible sidewall profile that can be used that fits within the involute profile used in the first embodiment. Other sidewall profiles for heightened portion 102 are also possible.

Teeth having a non-involute sidewall profile in the heightened section are referred to by reference numeral 200, and spur gears having at least one tooth containing this sidewall profile are referred to by reference numeral 20. As with the first embodiment, the new tooth design reduces the probability of interference between engaging spur gears having heightened teeth addendums when the axes of the engaging gears are not perfectly aligned. Flat surfaces 121 and 211 can be made by cutting and grinding a heightened involute tooth 64a shown in FIGS. 2A, 2B, 4A, 4B, and 4C.

As described above, in a driving mechanism often used in communication electric equipment, collisions between teeth of an idle gear and a connecting gear, i.e., teeth of a high-teeth gear having a high-toothed addendum, are prevented, so that noise can be reduced. Also, since the damage on the gear due to gear collision is prevented, malfunction in the driving mechanism can be prevented. Further, although the shafts of the gears may not be parallel with each other, the driving mechanism operates smoothly without the collision between gear teeth because the high-toothed addendum is formed in the connecting gear.

While there have been illustrated and described what are considered to be preferred embodiments of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. A spur gear, comprising:
    a shaft;
    a base supported on said shaft and having a perimeter defining a root circle;
    a plurality of teeth each having a constant pressure angle, distributed about said root circle, at least one tooth having:
        a first end portion and a second end portion that meet to define a boundary parallel to a plane of rotation of said spur gear;
        a pair of tooth faces having an involute profile and spanning both said first end portion and said second end portion of said at least one tooth with said pair of tooth faces coming to a line contact spanning said first end portion; and
        said first end portion of said at least one tooth radially extends outward by a first distance from said root circle that is greater than a second distance that said second end portion of said at least one tooth radially extends outward from said root circle, said first end portion having a tooth profile defining said line contact at an outermost radial extremity of said first end portion from said root circle.

2. The spur gear of claim 1, further comprised of said first distance being constant along a direction parallel to an axis of rotation throughout said first end portion.

3. The spur gear of claim 2, further comprised of said second distance being constant along a direction parallel to an axis of rotation throughout said second end portion.

4. The spur gear of claim 3, further comprised of said secondend portion occupying at least three-fourths of said at least one tooth at the exclusion of said first end portion.

5. The gear of claim 4, further comprised of said secondend portion of said tooth forming a flat surface at the outermost radial extremity of said at least one tooth from said root circle.

6. The spur gear of claim 1, further comprised of:
    said distance to which said at least one tooth extends from said root circle being constant along said first end portion;
    said distance to which said at least one tooth extends from said root circle being constant along said second end portion;

said second end portion of said at least one tooth occupying at least three-fourths of said face width of said at least one tooth at the exclusion of said first end portion;

said second end portion of said at least one tooth forming a flat surface at the outermost radial extremity of said at least one tooth from said root circle; and said flat surface on said second end portion of said at least one tooth slidably engaging with a heightened tooth of an engaging gear as said teeth of said spur gear and said engaging gear mesh.

7. An interference preventing gear in communication and electronic equipment comprising a plurality of gears of a driving mechanism engaged with each other, at least one of said gears being a high-teeth gear, said interference preventing gear comprising a first addendum in a first portion of a tooth that is greater than a second addendum in a second portion of said tooth, said tooth having a constant pressure angle;

said first portion of said tooth occupying less than one-quarter of a width of said tooth as defined by said first portion and said second portion; and a pair of tooth faces each having an involute profile and spanning both said first portion and said second portion of said tooth with said pair of tooth faces coming to a line contact spanning said first portion.

8. A spur gear, comprising:

a base having a plurality of teeth, each having a constant pressure angle, distributed about a root circle, said base having a tooth comprising:

a first portion and a second portion that meet to define a boundary parallel to a plane of rotation of said spur gear;

said first portion of said tooth having a pair of involute tooth faces that come to a line contact spanning said first portion; and said second portion of said tooth having a tooth profile having a different profile from said first portion and having an addendum that is less than that of said first portion.

9. The spur gear of claim 8, further comprised of said first portion having a constant addendum throughout said first portion.

10. The Spur gear of claim 9, further comprised of said second portion having a constant addendum throughout said second portion.

11. The spur gear of claim 10, further comprised of said second portion of said tooth occupying at least three fourths of said tooth to the exclusion of said first portion.

12. The spur gear of claim 11, further comprised of said second portion of said tooth having a flat surface at an outermost radial extremity from said root circle.

13. The spur gear of claim 8 further comprising said second portion of said tooth having a different shape from said first portion.

14. The spur gear of claim 8, further comprising said second portion of said tooth having a smaller addendum than said first portion of said tooth to reduce the interference between said spur gear and a second gear when both gears are misaligned during operation.

15. The spur gear of claim 8, further comprising:

a driving spur gear engaged with said spur gear and providing a force to said spur gear; and an idle spur gear engaged with said spur gear and having an axis of rotation linearly aligned with the axis of rotation of both said driving spur gear and said spur gear.

* * * * *